June 26, 1945.　　　G. T. WILSON　　　2,379,267
APPARATUS FOR LAUNCHING OR ASSISTING IN THE LAUNCHING OF AIRPLANES
Filed Jan. 22, 1942　　　3 Sheets-Sheet 1
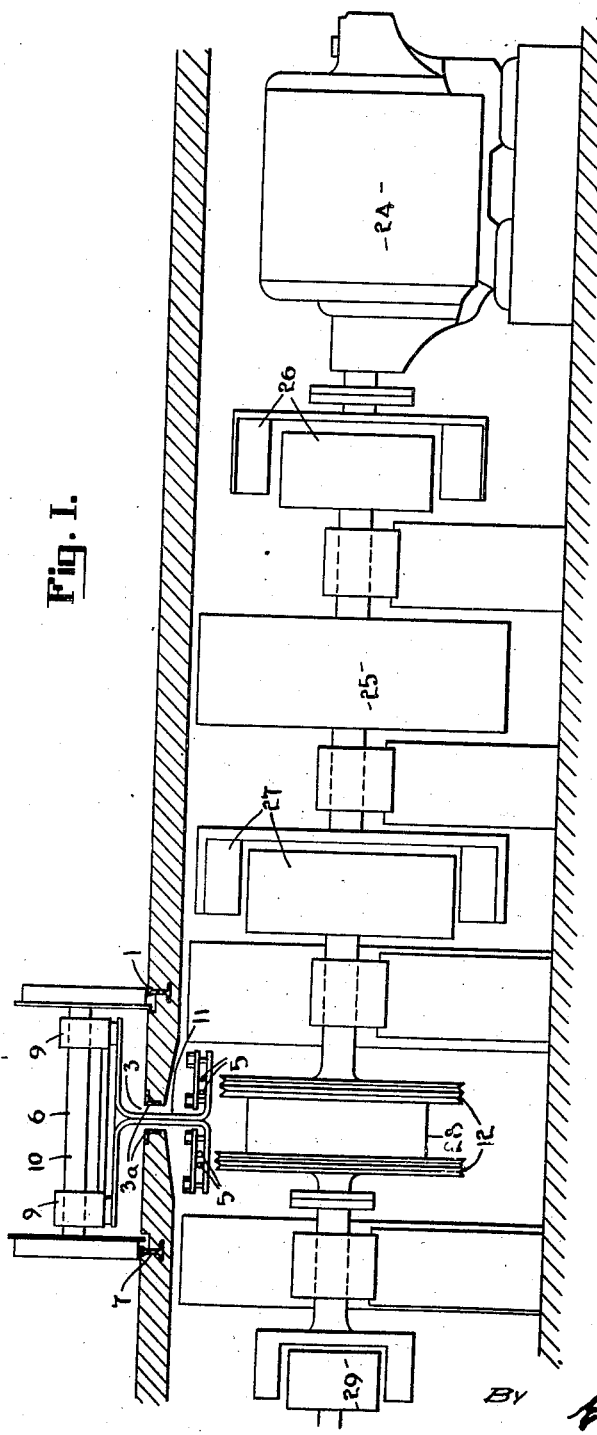
Fig. I.
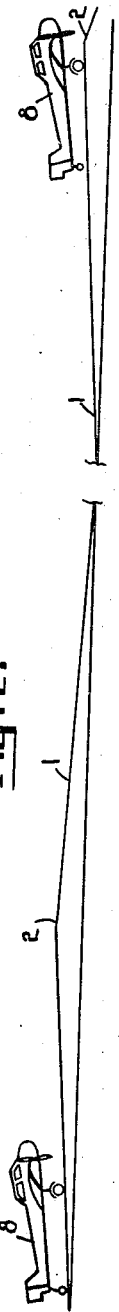
Fig. 2.
INVENTOR
G. T. Wilson
BY
ATTORNEY

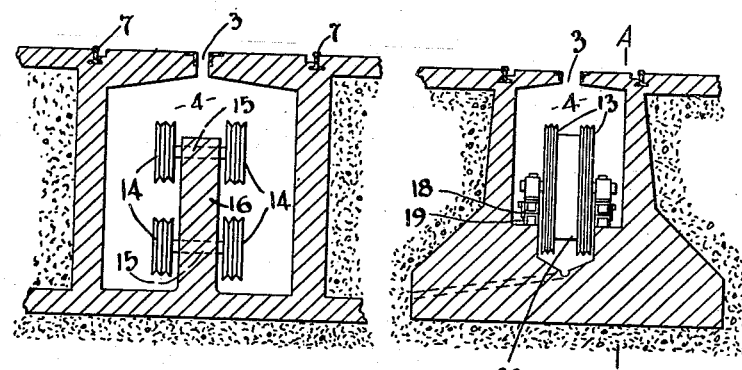
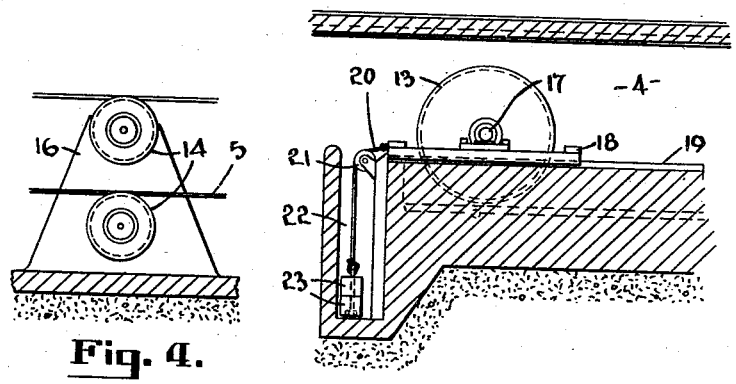

June 26, 1945.   G. T. WILSON   2,379,267
APPARATUS FOR LAUNCHING OR ASSISTING IN THE LAUNCHING OF AIRPLANES
Filed Jan. 22, 1942   3 Sheets-Sheet 3

INVENTOR
G. T. Wilson
By
ATTORNEY

Patented June 26, 1945

2,379,267

UNITED STATES PATENT OFFICE 2,379,267

APPARATUS FOR LAUNCHING OR ASSISTING IN THE LAUNCHING OF AIRPLANES

Gilbert Thomas Wilson, Karori, Wellington, New Zealand

Application January 22, 1942, Serial No. 427,804
In New Zealand February 20, 1941

10 Claims. (Cl. 244—63)

It is well-known that considerably more power is required to launch an airplane into the air than is required to maintain it in normal flight. This is particularly so where the flying field is of limited area.

It is also well known that for any increase in the rate of acceleration of an airplane on the ground there is a corresponding reduction in the length of run-way required for taking off.

Launching means at present employed for assisting in the launching of airplanes are not capable of launching heavily laden airplanes at a sufficient rate of acceleration with the result that there is an undue limitation on the loads that airplanes can leave the ground with for a given length of run-way.

This invention relates to methods of, and means for, launching or assisting in the launching of an airplane, and aims to provide improvements therein which will considerably increase the acceleration of the airplane on the ground and thus enable the plane to take off with a much greater load than is possible when the airplane is launched in any known manner. The invention also enables a shorter run-way to be employed for a given loading of the airplane.

It will be realized that an increase in the possible loading of a plane will, if taken advantage of to carry extra fuel, give a longer range. On the other hand, for commercial and wartime purposes, a plane could be launched with a greater pay-load or a greater load of explosives, as the case may be.

The invention consists in apparatus for launching or assisting in the launching of an airplane, comprising a power unit, a heavy flywheel driven from said power unit through an electro-magnetic slip coupling, an electro-magnetic slip coupling between said flywheel and the driving sheaves of multiple cable launching means, means to controllably energise said electro-magnetic slip couplings when desired, a carriage actuable by said cable launching means and adapted to propel the airplane and braking means to stop the carriage when desired.

The invention will now be described with reference to the accompanying diagrammatic drawings, in which:

Figure 1 is a vertical section through an underground room containing the operating mechanism of one form of launching means according to the invention, Figure 2 is a diagram illustrating a preferred run-way contour employing ramps, Figure 3 is a cross-section through the underground tunnel employed in the construction shown in Figure 1, showing one of the columns carrying the intermediate cable-supporting sheaves, Figure 4 is a longitudinal part section through the tunnel, showing a side view of one of said columns, Figure 5 is a cross-section through the tunnel, showing how the cable-tensioning sheaves at the end of the run-way opposite to the driving end are mounted.

Figure 6 is a longitudinal part-section on the line A—B Figure 5,

Figure 7:
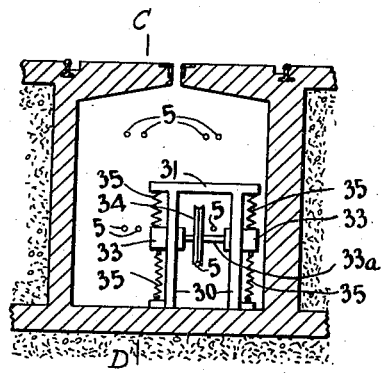
Figure 7 is a cross-section through the tunnel, showing one of a series of intermediate tensioning sheaves for independently evening up each cable and thus ensuring an even load on each cable.

A run-way 1 is provided disposed in the direction of the prevailing wind at the particular flying field. The run-way may be from 600 feet to 1200 feet in length and may have two small ramps 2, one at each end, the grade of which may be 1 in 20, the object of the two ramps being to assist the airplane in taking off, which may be in either direction along the run-way, according to the direction of the wind.

The run-way may be laid out so that the top of each ramp is say about 100 feet from the nearest end of the run-way, the ramps having the same slope on either side and a level runway being provided between them.

Provision may be made to light the run-way, both flood and signal lights may be provided for night operation.

I prefer to provide the run-way in such a position as to leave the main area of the aerodrome clear for landing and other purposes.

I believe it is best to house the operating mechanism below the ground as shown, although this is not absolutely necessary. It has the advantage that other aircraft can take off across the run-way when the launching mechanism is not in use.

A slot 3 is formed longitudinally of the runway, said slot communicating with a longitudinal tunnel 4 beneath the runway and being defined by angle metal protecting plates 3a. The tunnel contains cables 5, sheaves for said cables, and other mechanism to be hereinafter described.

Preferably the tunnel is sufficiently large in section for a mechanic to walk along same and inspect the cables, bearings and sheaves. For instance it may be about 6 feet high and 6 feet wide.

A wheeled truck or carriage 6 runs along rails 7 disposed longitudinally of the run-way and is preferably adapted to engage behind the undercarriage of the airplane 8 or a member associated therewith, or the airplane may rest on the carriage, a stop being provided to engage behind the wheels of the airplane. In either case the airplane is free to rise when it reaches flying speed. Preferably the bearings 9 by which the axles 10 of the carriage are carried are of the Timken or a similar type. The method of actuating the carriage will be hereinafter described.

At or near each end of the carriage, a member 11 projects downwards through the longitudinal slot 3 into the tunnel and is there connected to a plurality of cables 5 running lengthwise of the tunnel, such cables being continuous and being looped around driving sheaves 12 at one end of the tunnel and around tension sheaves 13 at the other end of the tunnel.

For normal use, I may employ about four flexible cables of no larger than ⅝ inch diameter (each with a breaking strain of not less than 12.5 tons). It will be understood however that the diameters of the cables and the breaking strain will vary according to the maximum load to be imposed thereon.

The cables are spaced horizontally and rest at intervals in the tunnel upon intermediate cable-supporting sheaves 14 mounted preferably upon spindles 15 carried by upright columns 16 located centrally or at one side or other of the tunnel. The use of several small wire ropes instead of a single cable provides sufficient flexibility to ensure adhesion to the sheaves at high speed.

The cable-tensioning sheaves 13 at the end of the run-way opposite to the driving end are provided to keep the cables under the desired tension and limit whipping when the drive is suddenly changed from full-speed to braking and stopping. Such cable-tensioning sheaves may be mounted to a spindle 17 carried by a slide 18 which is longitudinally adjustable in either direction along rails 19 and which has connected thereto a tensioning cable or cables 20 passing over a pulley or pulleys 21 into a pit 22 where a weight or weights 23 is or are provided on the lower end or ends thereof.

Figure 8:
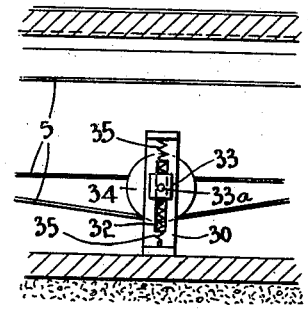
Figure 8 is a longitudinal part-section through the tunnel, on the line C—D, Figure 7.

Independent tensioning sheaves are preferably employed to independently even up each cable and thus ensure even load on the same. In the construction shown in Figures 7 and 8, at spaced intervals along the tunnel there are provided four independent tensioning sheaves 34, each supported from two vertical uprights 30 which may be connected together at their upper ends as at 31. The uprights are provided with vertical slots 32 in which bearings 33 slide vertically, said bearings carrying a horizontal shaft 33a on which is mounted the sheave 34. The bearings are spring-loaded as at 35 so that the sheave exerts a downward pressure on the lower stretch of one of the cables 5 and, by putting a bend in same, tensions it independently of the other cables. One of the other three cables passes freely between the uprights 30 and the other two cables are disposed outside same.

At the driving end of the run-way, a power-unit 24 (which may be an electric motor or an internal combustion engine or steam engine) is coupled to a heavy flywheel 25 (say 10 tons in weight and having a steel rim and web to withstand the great centrifugal force it has to contend with). In the case of an electric motor or other power unit which cannot take the load up at once, the coupling is effected through the medium of a suitable slip coupling 26. This coupling is of the electro-magnetic type and is controllably energised from a suitable D. C. electric power source, consisting of for instance a suitably driven D. C. generator. The slipping enables the power unit 24 to work at a satisfactory operating speed while the wheel 25 is reaching normal speed of say about 750 R. P. M. and while the said wheel is slowing down under load.

It will be clear that the electro-magnetic slip-coupling 26 could be replaced by some other flexible coupling such as a fluid flywheel.

A flexible coupling between the power unit and the wheel 25 would not be essential if the power unit consists of a steam engine.

The flywheel 25 is connected to the driving sheaves 12 through the medium of a second electro-magnetic slip-coupling 27 which can be readily controlled to transmit the drive at will, so that when the coupling 27 is energised by a suitable D. C. source (which may be the source mentioned earlier herein) it will transmit the kinetic energy stored in the flywheel 25, and also a substantial portion of the torque exerted by the power unit in rotating the said flywheel 25, to the cables 5.

I propose to employ large-surface brakes 28 to stop the carriage 6 and the cables 5. (It will be realised that only the cables and the carriage require to be stopped by the brakes. The heavy flywheel 25 and power unit 24 still run on to be shut down at any convenient time.)

I may divide the cables 5 into two groups of two cables, and carry the two groups by separate driving, supporting and tensioning sheaves, as shown. Each driving and tensioning sheave around which a cable is looped may then have a brake acting thereon.

The aforesaid small D. C. generator employed to energise the electro-magnetic slip couplings 26 and 27 may also be employed to energise solenoids releasing the brakes 28. The dual function of releasing the brakes and energising the electro-magnetic slip coupling 27 between the wheel and the driving sheaves is preferably achieved through a single control which releases the brakes and energises the slip coupling 27 in the one operation. The control switch for this purpose could be under the control of the pilot who could start the cables in motion by operating a button switch on a flex cable (as the current for the electro-magnetic slip coupling 27 is not very large). When he has pressed the button, the pilot could throw same and the attached flex clear of the plane and carriage 6. The switch on the flex cable could be located in a "starting" circuit so that closing of the said switch on the flex cable closes a remote controlled switch on the main D. C. circuit.

The stopping of the carriage 6 could be controlled by a control operable by such carriage reaching a predetermined speed, or by various distances of run. Whichever method of stopping the carriage is employed, the electromagnetic slip-coupling 27 between the wheel 25 and the driving sheaves 12 would be cut out and the brakes 28 would be applied.

Figure 9:
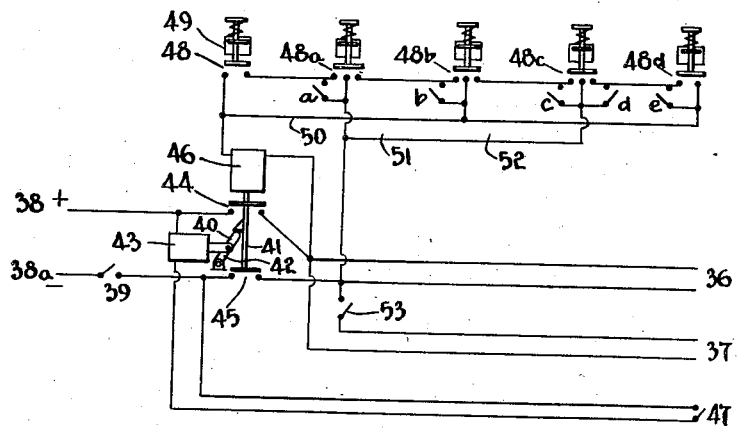
Figure 9 is a diagram illustrating a possible circuit layout for controlling the drive to the cables.

The circuit arrangement shown diagrammatically in Figure 9 is designed so that the electromagnetic slip coupling 27 will be de-energised and the solenoid brakes 28 applied when the carriage has reached a predetermined speed. The brake solenoids and the slip-coupling 27 are connected in parallel to the leads 36 and 37 respectively in a main D. C. circuit, the leads 38 and 38a being for connection to a suitable power source, for instance the D. C. source previously referred to, and a suitable main switch 39 being provided.

In the main D. C. circuit there is interposed a double pole switch 44—45 which is held closed under spring pressure during launching operations and opened simultaneously by means to be hereinafter described so as to open the main D. C. circuit and thus discontinue the drive and apply the brakes.

The switch 44—45 is held open by means of a pawl 40 which preferably has a rounded upper end engaging beneath a projection on the switch rod 41. To release the pawl from the projection for starting purposes, said pawl may have pivoted to it a rod 42 of a solenoid 43 which is located in a "starting" circuit part of which is coincident with the main D. C. circuit so that the "starting" circuit is beyond the control of the switch 44—45 but under the control of the main switch 39. The solenoid 43 is spring-loaded so that when the "starting" circuit is open, said spring holds the pawl 40 towards the switch rod 41.

In the "starting" circuit is located a spring-returned switch 47 the closing of which releases the pawl 40 to permit the switch 44—45 to close under the spring pressure, the brakes being thus released and the slip coupling 27 being energised to drive the sheaves 12. The switch 47 is preferably a button switch under the control of the pilot as previously suggested.

The means to open the main D. C. circuit for stopping purposes may comprise an impulse solenoid 46 actuating the switch rod 41, said solenoid 46 being energised from a "stopping" circuit 52 part of which is coincident with the main D. C. circuit so that when the switch 44—45 is open the "stopping" circuit is open. The "stopping" circuit is closed in the following way:

At spaced points along the run-way, say at about 100 feet intervals, there are provided depression switches 48, 48a, 48b, 48c and 48d which are adapted to be closed by a wheel of the carriage passing thereover. Each depression switch is spring-loaded to return same, but its upward return movement is damped by a fluid dash-pot 49. The depression switches 48 and 48d are each adapted when depressed to engage two contacts and the other depression switches 48a, 48b, and 48c are adapted to engage three contacts.

Two leads 50 and 51 are provided in the "stopping" circuit and alternate depression switches have one contact connected to the lead 50, one contact of each of the other switches being connected to the other lead 51.

The remaining contacts of the depression switches are connected to the remaining contacts of the adjacent switches in the manner shown, so that the mere closing of one of the depression switches will not close the "stopping" circuit and it will be necessary for the carriage to close any of the depression switches 48a to 48d before the previous depression switch has opened for the "stopping" circuit to be closed and the solenoid 46 to be thus energised to open the switch 44—45 and thereby de-energise the coupling 27 and the brake solenoids. It will therefore be obvious that the closing of the "stopping" circuit is dependent on the speed of the carriage or member carrying the airplane.

On the opening of the switch 44—45 the pawl 40 comes into operation to keep the said switch open until the solenoid 43 is operated to release the switch 44—45 and thus permit same to close.

An advantage of providing for the "stopping" circuit to be subject to the control of the switch 44—45 is that immediately the "stopping" circuit is closed the switch 44—45 opens, and the "stopping" circuit is then open when the depression switches open again, arcing at the contacts of the depression switches being thus minimised.

A single pole switch could be employed instead of the double-pole switch 44—45, the use of the double-pole switch however minimising arcing on the opening of the main D. C. circuit.

In Figure 9 I show means which may be provided so that the drive will be discontinued and the brakes will be applied on the carriage reaching any one of a series of predetermined points. For this purpose I provide a series of short-circuiting switches a, b, c, d, and e so connected in the circuit that operation of any one of such switches provides for the "stopping" circuit to be closed on the operation of a single corresponding depression switch, so that it is unnecessary for two depression switches to be closed together for the said circuit to be closed.

The short-circuiting switches, which when closed will result in the closing of the "stopping" circuit when the depression switches 48, 48a, 48b, 48c and 48d are closed, are the switches a, b, c, d, and e, respectively.

The distance which the carriage or member will travel before stopping depends on which of the switches a, b, c, d or e are closed. It will be obvious that if any of the short-circuiting switches c, d, or e are closed the "stopping" circuit will be closed either on the closing of any two adjacent depression switches preceding the depression switch which co-acts with the closed short-circuiting switch to close the said circuit, or on the closing of the depression switch which with the closed short-circuiting switch closes such circuit, depending on the rate of acceleration of the airplane.

The depression switches may be of any known reliable type giving the desired degree of damping, and the number employed along the run-way may be varied according to requirements.

Any other suitable means may be employed to close the "stopping" circuit when the airplane has reached a predetermined point. A simple switch which when closed remains closed until manually opened could be employed.

The carriage 6 may be returned by a small motor driving the driving sheaves 12 through a controllable slip coupling 29 in the reverse direction to that in which they are driven by the wheel 25, and the control means for driving such reversing motor may be arranged to automatically release the solenoid brakes 28. Such control means must not however energise the electromagnetic slip coupling 27.

In Figure 9 is shown a switch 53 which if opened will permit the carriage to be returned on the closing of the switch 39, the releasing of the pawl 40 from the projection on the rod 41 and the closing of the circuits through the reversing motor and the coupling 29.

In the main underground motor room may be mounted the solenoid switch apparatus, and all the manually operable switches which must be accessible in normal operation may be above ground. The underground motor room may be locked normally to prevent interference with the apparatus therein contained.

Owing to the considerable strain which the driving mechanism meets with in operation, I prefer that as a precautionary measure the primary electro-magnetic slip coupling 26 should be capable of transmitting between 50% and 100% in excess of the power developed by the power unit. The secondary electro-magnetic slip coupling 27 may be designed to transmit about four times the power actually developed by the power unit, to permit it to transmit efficiently the power stored up in the wheel 25 and a substantial part of the torque applied by the power unit in rotating the said wheel.

By my invention, the power actually applied to the cables 5 by the wheel 25 may be boosted up to for instance anywhere between 200% and 400% of the power actually developed by the power unit.

The electro-magnetic slip-couplings 26 and 27 and 29 may be of a type similar to those used in geared Diesel engines for marine propulsion.

In operation, with the construction shown in the drawings, the power unit 24 is started up and the electro-magnetic slip coupling 26 is energised. When the wheel 25 is rotating at maximum speed and it is desired to launch an airplane, the said airplane, with its motor running, is placed in position so that the carriage 6 will carry same with it along the run-way, and the pilot simultaneously opens the throttle and operates the button switch, thus closing the switch 44—45 and thereby releasing the brakes 28 and energising the electro-magnetic slip coupling 27. The stored up energy in the wheel 25 is immediately made available, and, supplemented by at least a substantial part of the driving torque of the power unit 24, it assists the plane along the runway. The secondary electro-magnetic slip-coupling 27 enables smooth and rapid acceleration of the carriage. During acceleration of the carriage 6 the heavy wheel 25 slows down to an extent depending on the extent to which its stored energy is utilised to assist the launching.

When the plane reaches the summit of the second ramp, or before then, by which time it may be travelling at say about 70 M. P. H., it is launched and is free to leave the carriage 6 which is braked and stopped by either of the methods previously described, the carraige being then returned. The secondary electro-magnetic slip coupling 27 does not transmit any drive at this stage, even though the power unit 24 may be operating.

The power unit 24 may be stopped when desired.

To launch in the reverse direction, the main motor is reversed, the carriage being started at the opposite end of the run-way. It will be obvious that when the airplane is being launched towards the end tensioning-sheaves the horizontal pull on said sheaves requires a considerable resistance to counteract it, and such resistance is applied by employing balance weights 23 of the desired weight. It will also be obvious that the reversing motor will require to be reversible to permit the carriage to be returned from either end.

Having now explained the nature of the objects of the invention and having specifically described constructions embodying the invention, what I claim is:

1. Apparatus for launching or assisting in the launching of an airplane; comprising a power unit; a heavy flywheel, an electro-magnetic slip coupling for driving said flywheel from said power unit; multiple cable launching means including driving sheaves; an electro-magnetic slip coupling between said flywheel and the driving sheaves; means to controllably energise said electro-magnetic slip couplings when desired, including a main D. C. circuit having therein the energising circuit of the slip coupling between the flywheel and the driving sheaves; a carriage actuable by said cable launching means and adapted to propel the airplane; a track along which said carriage runs; and braking means to stop the carriage, including a "stopping" circuit, a series of depression switches in said "stopping" circuit located adjacent to the track so as to be closed in succession by the carriage passing along the track, and hydraulically damped spring return means for said depression switches, the "stopping" circuit being closed on the carriage closing a depression switch before the immediately preceding depression switch has opened, an impulse-solenoid operated remote-controlled switch operable by closing of said "stopping" circuit to open the main D. C. circuit, solenoid brake-releasing means comprising an energising circuit located in the main D. C. circuit so that opening of said main D. C. circuit de-energises said slip-coupling between the flywheel and the driving sheaves and applies the braking means to stop the carriage, and means to maintain the main D. C. circuit open until again closed.

2. Apparatus for launching or assisting in the launching of an airplane; comprising a power unit; a heavy flywheel; an electro-magnetic slip coupling for driving said flywheel from said power unit; multiple cable launching means including driving sheaves; an electro-magnetic slip coupling between said flywheel and the driving sheaves; means to controllably energise said electro-magnetic slip couplings when desired, including a main D. C. circuit having therein the energising circuit of the slip coupling between the flywheel and the driving sheaves; a carriage actuable by said cable launching means and adapted to propel the airplane; a track along which said carriage runs; braking means to stop the carriage, including a "stopping" circuit, a series of depression switches in said "stopping" circuit located adjacent to the track so as to be closed in succession by the carriage passing along the track, and hydraulically damped spring return means for said depression switches, the "stopping" circuit being closed on the carriage closing a depression switch before the immediately preceding depression switch has opened, an impulse solenoid operated remote-controlled switch operable by closing of said "stopping" circuit to open the main D. C. circuit, solenoid brake-releasing means the energising circuit of which is located in the main D. C. circuit so that opening of said main D. C. circuit de-energises said slip-coupling between the flywheel and the driving sheaves and applies the braking means to stop the carriage, and means to maintain the main D. C. circuit open until again closed; and switching means whereby when desired the carriage can be stopped on reaching a predetermined point irrespective of the speed of said carriage.

3. Apparatus for launching or assisting in the launching of an airplane; comprising a power unit; a heavy flywheel; an electro-magnetic slip-coupling for driving said flywheel from said power unit; multiple cable launching means including driving sheaves; an electro-magnetic slip-coupling between said flywheel and the driving sheaves; means to controllably energise said electro-magnetic slip couplings when desired, including a main D. C. circuit having therein the energising circuit of the slip coupling between the flywheel and the driving sheaves; a carriage actuable by said cable launching means and adapted to propel the airplane; a track along which said carriage runs; braking means to stop the carriage, including a "stopping" circuit, a series of depression switches in said "stopping" circuit located adjacent to the track so as to be closed in succession by the carriage passing along the track, hydraulically damped spring return means for said depression switches, the "stopping" circuit being closed on the carriage closing a depression switch before the immediately preceding depression switch has opened, a spring closed remote controlled impulse-solenoid operated switch opened by closing of said circuit to open the main D. C. circuit and the "stopping" circuit, solenoid brake releasing means the energising circuit of which is located in the main D. C. circuit so that opening of said main D. C. circuit de-energises said slip coupling between the flywheel and the driving sheaves and applies the braking means to stop the carriage, and releasable means to maintain the said remote-controlled solenoid operated switch open until again closed.

4. Apparatus for launching or assisting in the launching of an airplane; comprising a power unit; a heavy flywheel; an electro-magnetic slip coupling for driving said flywheel from said power unit; multiple-cable launching means including driving sheaves; an electro-magnetic slip-coupling between said flywheel and the driving sheaves; means to controllably energize said electro-magnetic slip couplings when desired, including a main D. C. circuit having therein the energising circuit of the slip coupling between the flywheel and the driving sheaves, a "starting" circuit, a switch therein, a solenoid energised by the closing of said "starting" circuit, and release means operable by the energising of said latter solenoid; a carriage actuable by said cable launching means and adapted to propel the airplane; a track along which said carriage runs; braking means to stop the carriage, including a "stopping" circuit, a series of depression switches in said "stopping" circuit located adjacent to the track so as to be closed in succession by the carriage passing along the track, hydraulically damped spring return means for said depression switches, the "stopping" circuit being closed on the carriage closing a depression switch before the immediately preceding depression switch has opened, a spring-closed remote-controlled impulse solenoid operated switch opened by closing of said circuit to open the main D. C. circuit and the "stopping" circuit, solenoid brake releasing means the energising circuit of which is located in the main D. C. circuit so that opening of said main D. C. circuit de-energises said slip coupling between the flywheel and the driving sheaves and applies the braking means to stop the carriage, and releasable means to maintain the said remote-controlled solenoid operated switch open until again closed, said releasable means being released by the aforesaid release means, to enable the remote-controlled solenoid operated switch to close and the slip coupling and brake solenoids to be energised.

5. Apparatus for launching or assisting in the launching of an airplane; comprising a power unit; a heavy flywheel; an electro-magnetic slip coupling for driving said flywheel from said power unit; multiple cable launching means including driving sheaves; an electro-magnetic slip coupling between said flywheel and the driving sheaves; means to controllably energise said electro-magnetic slip couplings when desired, including a main D. C. circuit having therein the energising circuit of the slip coupling between the flywheel and the driving sheaves, a "starting" circuit, a button switch on a flex cable in said "starting" circuit, said switch being under the control of the pilot, a solenoid energised by the closing of said "starting" circuit, and release means operable by the energising of said latter solenoid; a carriage actuable by said cable launching means and adapted to propel the airplane; a track along which said carriage runs; braking means to stop the carriage, including a "stopping" circuit, a series of depression switches in said "stopping" circuit located adjacent to the track so as to be closed in succession by the carriage passing along the track, hydraulically damped spring return means for said depression switches, the "stopping" circuit being closed on the carriage closing a depression switch before the immediately preceding depression switch has opened, a spring closed remote-controlled impulse-solenoid operated switch opened by closing of said circuit to open the main D. C. circuit and the "stopping" circuit, solenoid brake-releasing means the energizing circuit of which is located in the main D. C. circuit so that opening of said main D. C. circuit de-energises said slip coupling between the flywheel and the driving sheaves and applies the brakes to stop the carriage, and releasable means to maintain the said remote-controlled solenoid operated switch open until again closed.

6. Apparatus for launching or assisting in the launching of an airplane, as claimed in claim 1, the said carriage being provided with a dependent connection attached to the cables of said multiple cable launching means, said cables passing around the driving sheaves at or adjacent to one end of the runway and around other sheaves at or adjacent to the opposite end of the runway, said cables being supported intermediate of the ends of the runway on spaced supports and the driving sheaves being secured to a shaft secured in turn to the driven member of the slip coupling driven by the heavy flywheel.

7. Apparatus for launching or assisting in the launching of an airplane, as claimed in claim 1, the said carriage being provided with a dependent connection attached to the cables of said multiple cable launching means, said cables passing around the driving sheaves at or adjacent to one end of the runway and around other sheaves at or adjacent to the opposite end of the runway, said cables being supported intermediate of the ends of the runway on spaced supports and the driving sheaves being secured to a shaft secured in turn to the driven member of the slip coupling driven by the heavy flywheel, the driving sheaves and the sheaves at or near the opposite end of the runway being fitted with the braking means for stopping the carriage.

8. Apparatus for launching or assisting in the launching of an airplane, as claimed in claim 1, the said carriage being provided with a dependent connection attached to the cables of said multiple launching means, said cables passing around the driving sheaves at or adjacent to one end of the runway and around other sheaves at or adjacent to the opposite end of the runway, said cables being supported intermediate of the ends of the runway on spaced supports and the driving sheaves being secured to a shaft secured in turn to the driven member of the slip coupling driven by the heavy flywheel, the driving sheaves and the sheaves at or near the opposite end of the runway being fitted with the braking means for stopping the carriage, the sheaves at the opposite end of the runway to the driving sheaves being tensioning sheaves.

9. Apparatus for launching or assisting in the launching of an airplane, as claimed in claim 1, the said carriage being provided with a dependent connection attached to the cables of said multiple launching means, said cables passing around the driving sheaves at or adjacent to one end of the runway and around other sheaves at or adjacent to the opposite end of the runway, said cables being supported intermediate of the ends of the runway on spaced supports and the driving sheaves being secured to a shaft secured in turn to the driven member of the slip coupling driven by the heavy flywheel, the driving sheaves and the sheaves at or near the opposite end of the runway being fitted with the braking means for stopping the carriage, the sheaves at the opposite end of the runway to the driving sheaves being tensioning sheaves and independent tensioning means being provided to independently tension the cables.

10. Apparatus for launching or assisting in the launching of an airplane, as claimed in claim 1, comprising also an independent reversing motor connected to the driving sheaves to bring the carriage back to starting position after launching an airplane, independent control means for the said reversing motor adapted to automatically release the brakes, and a controllable slip coupling between said reversing motor and the driving sheaves.

GILBERT THOMAS WILSON.